United States Patent
Yoshikawa

(10) Patent No.: US 7,707,531 B2
(45) Date of Patent: *Apr. 27, 2010

(54) METHOD AND PROGRAM FOR DESIGNING SEMICONDUCTOR INTEGRATED CIRCUITS, AND SEMICONDUCTOR INTEGRATED CIRCUIT DESIGNING APPARATUS

(75) Inventor: Atsushi Yoshikawa, Chiyoda-ku (JP)

(73) Assignee: Renesas Technology Corp., Chiyoda-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/379,361

(22) Filed: Feb. 19, 2009

(65) Prior Publication Data

US 2009/0164958 A1 Jun. 25, 2009

Related U.S. Application Data

(63) Continuation of application No. 11/516,552, filed on Sep. 7, 2006, now Pat. No. 7,512,920.

(30) Foreign Application Priority Data

Sep. 27, 2005 (JP) ............................. 2005-279917

(51) Int. Cl.
*G06F 17/50* (2006.01)
(52) U.S. Cl. .............................................. 716/6; 716/4
(58) Field of Classification Search ...................... None
See application file for complete search history.

(56) References Cited

U.S. PATENT DOCUMENTS 7,266,474 B2    9/2007  Habitz et al.
7,512,920 B2 *  3/2009  Yoshikawa ..................... 716/6

FOREIGN PATENT DOCUMENTS

JP        2005-122298        5/2005

* cited by examiner

*Primary Examiner*—Leigh Marie Garbowski
(74) *Attorney, Agent, or Firm*—Buchanan Ingersoll & Rooney PC

(57) ABSTRACT

Two paths (arrival and required paths) as a target of analysis are united into a single path, and an on-chip random variation component $\sigma r$ about a plurality of nodes of the single path is calculated. Next, an on-chip variation component $\sigma chip$ is calculated on the basis of the on-chip random variation component $\sigma r$ and an on-chip systematic variation component $\sigma s$. Subsequently, a delay variation $Docv$ is calculated on the basis of a reference delay $Dbase$ of the entire path and the on-chip variation component $\sigma chip$.

5 Claims, 7 Drawing Sheets

F I G . 1
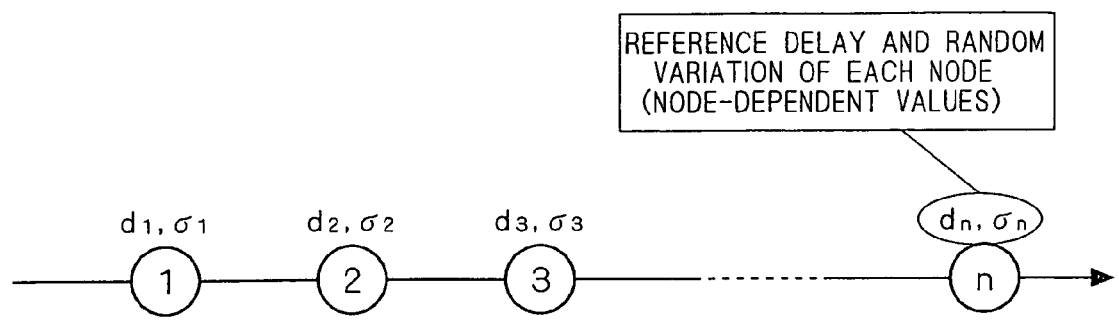
F I G . 2
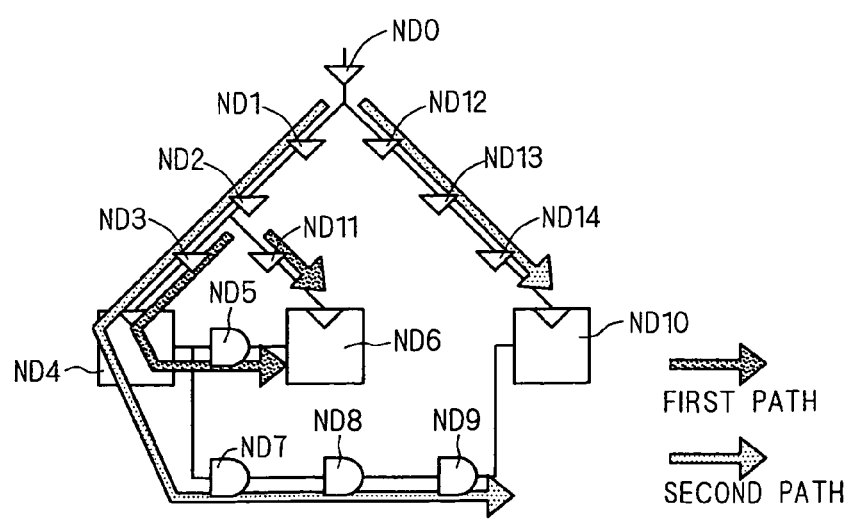

F I G . 1 1   Prior Art
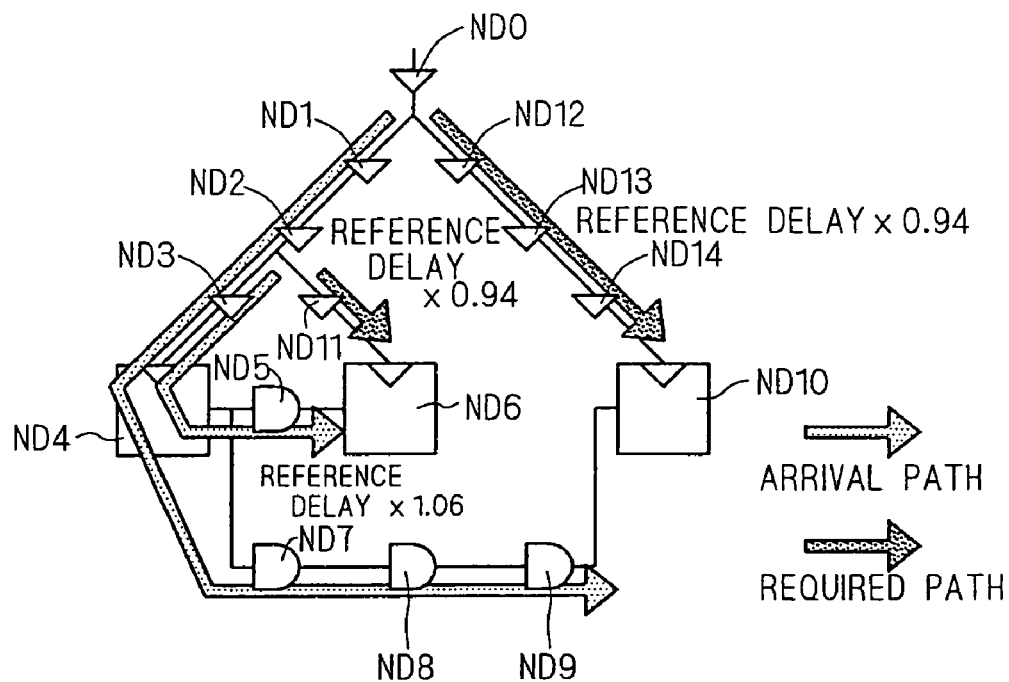
F I G . 1 2   Prior Art
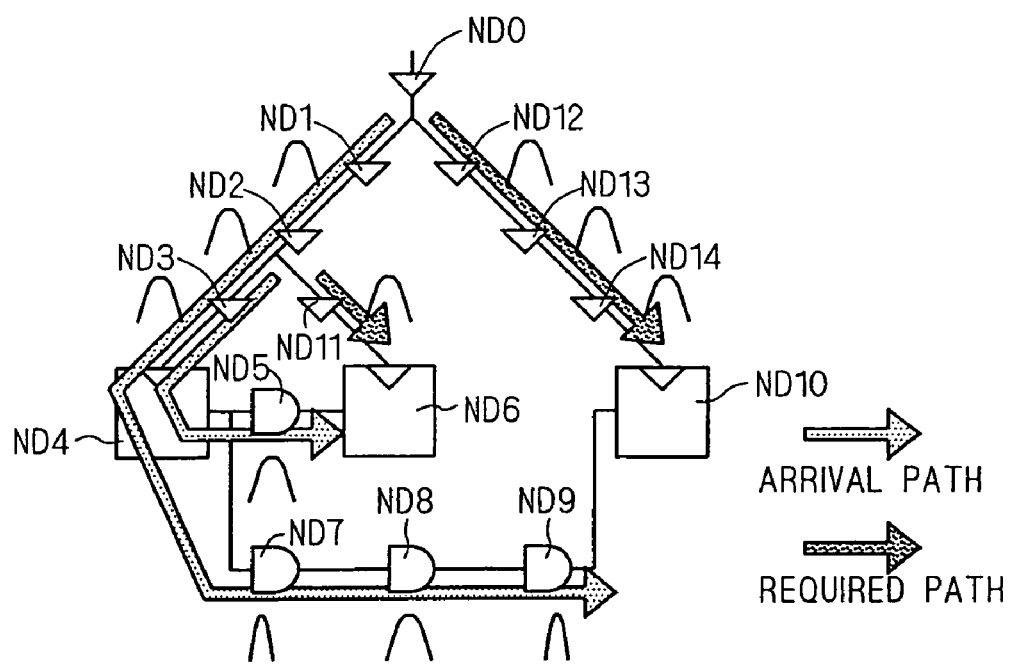

METHOD AND PROGRAM FOR DESIGNING SEMICONDUCTOR INTEGRATED CIRCUITS, AND SEMICONDUCTOR INTEGRATED CIRCUIT DESIGNING APPARATUS

BACKGROUND OF THE INVENTION

1. Field of the Invention

The present invention relates to a method and a program for designing semiconductor integrated circuits and a semiconductor integrated circuit designing apparatus, and particularly to a designing method, a program, and a semiconductor integrated circuit designing apparatus that utilize timing analysis using statistical techniques.

2. Description of the Background Art

FIG. 11 is a schematic diagram illustrating the concept of Static Timing Analysis (STA) that is known as a method of timing analysis of semiconductor integrated circuits.

FIG. 11 exemplifies a semiconductor integrated circuit having 15 nodes from ND0 to ND14. Nodes are defined herein as elements having delays, such as logic gates and interconnections, and it is assumed that the nodes ND4, ND6, and ND10 are flip-flops, the nodes ND5, ND7 to ND9 are AND logic gates, and the other nodes are unspecified logic gates.

In the static timing analysis, the results of analysis are represented with coefficients that are set to correct delay variations caused by an on-chip variation (OCV), one of element characteristic variations. As shown in FIG. 11, the correcting coefficients, by which the reference delays of nodes are to be multiplied, are calculated respectively for the arrival paths (data paths) and required paths (clock paths).

In FIG. 11, the arrival paths include two paths: a path passing from the node ND0 to the node ND10 through the nodes ND1 to ND4 and ND7 to ND9; and a path passing from the node ND2 to the node ND6 through the nodes ND3 to ND5, and the required paths include two paths: a path passing from the node ND0 to the node ND10 through the nodes ND12 to ND14; and a path passing from the node ND2 to the node ND6 through the node ND11.

The arrival paths and the required paths can be provided with coefficients individually. FIG. 11 shows an example of analysis in which the on-chip variation is regarded as ±6%, and the coefficient for the arrival paths is set as reference delay×1.06 (+6%) and the coefficient for the required paths is set as reference delay×0.94 (−6%).

FIG. 12 is a schematic diagram illustrating the concept of statistical STA that is known as another method of timing analysis.

The semiconductor integrated circuit of FIG. 12 has the same node structure as that of FIG. 11, and the same components as those of the semiconductor integrated circuit of FIG. 11 are shown at the same reference characters and are not described again.

As shown in FIG. 12, in the statistical STA, by considering variations, delays are handled as distributions, and the delay at each node is assumed to be a normal distribution and represented with a mean and a standard deviation, so as to conduct propagation analysis with normal distributions.

It is thought that on-chip variation components, particularly random variation components, become larger as the miniaturization of semiconductor process advances. Accordingly, if the value of on-chip variation is set too large in the design process in order to cover all possible circuit configurations, more margins than necessary will be ensured and performance and design convergence of semiconductor integrated circuits will be deteriorated.

On the other hand, if the on-chip variation value is set too small in design, necessary margin cannot be ensured and the possibility of malfunctions will increase.

As described referring to FIG. 11, the conventional static timing analysis assumes the on-chip variation correcting coefficients at fixed values, and the analysis is therefore unable to accurately provide random variation components that are statistically cancelled depending on the circuit configuration.

As disclosed in Japanese Patent Application Laid-Open No. 2005-122298 (FIGS. 3 and 4), a method is suggested in which the random variation component is calculated in accordance with the number of cell stages (the number of gate stages), but the method considers arrival and required paths separately and therefore involves unnecessary margins.

On the other hand, the statistical STA offers more realistic computation results because it represents delays with normal distributions and considers random variation components etc. in a statistical manner. However, the statistical STA takes a longer processing time than STA and at present cannot be applied to design of large-scale semiconductor integrated circuits.

SUMMARY OF THE INVENTION

An object of the present invention is to provide a semiconductor integrated circuit designing method and designing apparatus which are capable of considering more realistic process variations during designing process so as to avoid setting of design margins more than necessary to obtain enhanced performance and design convergence of semiconductor integrated circuits and so as to ensure necessary margins to obtain enhanced quality, while enabling simplified computation and high-speed operation.

The present invention provides a method of designing a semiconductor integrated circuit that is formed of a connection of a plurality of nodes and that has a clock path serving as a clock signal propagation route and a data path serving as a data signal propagation route, and the method includes the following steps (a) to (c). That is, the step (a) unites the clock path and the data path into a single path and calculates a standard deviation of random variation components of the plurality of nodes of the united path, the step (b) calculates a standard deviation of on-chip variation components on the basis of the standard deviation of the random variation components and a standard deviation of systematic variation components of the plurality of nodes of the united path, and the step (c) calculates a delay variation on the basis of the standard deviation of on-chip variation components and a reference delay of the entirety of the united path.

According to the designing method above, the clock path and the data path are united into a single path, a standard deviation of random variation components of the plurality of nodes of the united path is calculated, and a delay variation is calculated on the basis of the standard deviation of on-chip variation components and a reference delay of the entire united path, whereby the on-chip random variation components are obtained as a more realistic value in designing the semiconductor integrated circuit. This avoids setting of design margins more than necessary and offers enhanced performance and design convergence of the semiconductor integrated circuit, and also ensures setting of necessary margins and offers enhanced quality, while enabling simplified computation and high-speed operation.

According to a semiconductor integrated circuit designing apparatus of the present invention, the semiconductor integrated circuit is formed of a connection of a plurality of nodes and has a clock path serving as a clock signal propagation route and a data path serving as a data signal propagation route, and the designing apparatus includes an on-chip random variation components calculating block that unites the clock path and the data path into a single path and calculates a standard deviation of random variation components of the plurality of nodes of the united path, an on-chip variation component calculating block that calculates a standard deviation of on-chip variation components on the basis of the standard deviation of the random variation components and a standard deviation of systematic variation components of the plurality of nodes of the united path, and a delay variation calculating block that calculates a delay variation on the basis of the standard deviation of on-chip variation components and a reference delay of the entirety of the united path.

According to the designing apparatus, the on-chip random variation components are obtained as a more realistic value in designing the semiconductor integrated circuit, which avoids setting of design margins more than necessary and offers enhanced performance and design convergence of the semiconductor integrated circuit, and also ensures setting of necessary margins and offers enhanced quality, while enabling simplified computation and high-speed operation.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram schematically illustrating a semiconductor integrated circuit having n nodes;

FIG. 2 is a diagram schematically showing a semiconductor integrated circuit used to describe a designing method according to a preferred embodiment of the invention;

FIG. 11 is a schematic diagram illustrating a concept of static timing analysis; and FIG. 12 is a schematic diagram illustrating a concept of statistical static timing analysis.

DESCRIPTION OF THE PREFERRED EMBODIMENTS

Preferred Embodiment

A. Basic Concept of the Invention

Figure 3:
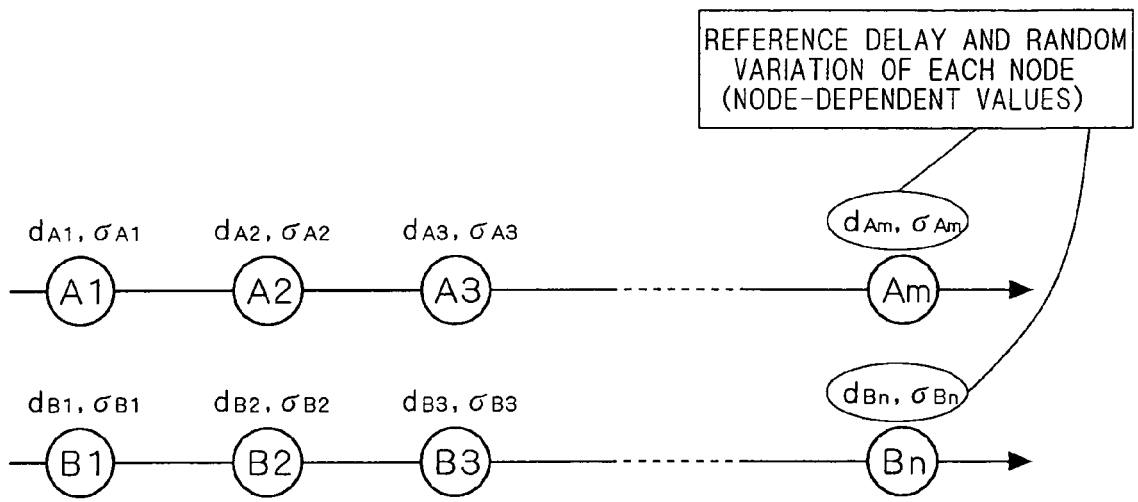
FIG. 3 is a diagram schematically illustrating a semiconductor integrated circuit for which the on-chip variation is to be considered.

First, the basic concept of the semiconductor integrated circuit designing method of the invention will be described.

Components of variations of semiconductor element characteristics caused by semiconductor process are classified, and the ratios of delay variation (deviations from average delay) caused by the variation components are assumed to be normal distributions and represented with standard deviations as described below.

That is, with a plurality of nodes in a semiconductor chip (hereinafter referred to as "chip"), the standard deviation of random variation components of the nodes is represented as σr, the standard deviation of systematic variation components of the nodes is represented as σs, and the standard deviation of variation components of other chips (Off Chip) is represented as σf. Hereinafter, for the sake of convenience, σr, σs, and σf are referred to as a random variation component, a systematic variation component, and an off-chip variation component.

Now, for example, the random variation component is such a component that a clear difference in characteristic is exhibited between adjacent semiconductor elements, and the systematic variation component is such a component that a clear difference in characteristic is not exhibited between adjacent semiconductor elements but a clear difference in characteristic is exhibited between semiconductor elements located in somewhat separated positions.

The off-chip variation component is such a component that a difference in average characteristic is exhibited between chips formed on the same wafer, a difference in average characteristic is exhibited between chips formed on different wafers, or a difference in average characteristic is exhibited between chips fabricated in different lots.

When the distribution of each variation component is assumed to be a normal distribution, the standard deviation of the components including all variations and the standard deviation of the on-chip variation components can be statistically defined as below.

That is, when the standard deviation of the all-variation-including components (which is hereinafter also referred to simply as an all variation including component) is σall, then σall is defined by Expression (1) below.

$$\sigma_{all} = \sqrt{\sigma_r^2 + \sigma_s^2 + \sigma_f^2} \quad (1)$$

Also, when the standard deviation of all on-chip variation components (which is hereinafter also referred to simply as an on-chip variation component) is σchip, then the σchip is defined by Expression (2) below.

$$\sigma_{chip} = \sqrt{\sigma_r^2 + \sigma_s^2} \quad (2)$$

Now, among the on-chip variation components, let us pay attention to the random variation component.

The random variation component varies depending on the logic gate circuit configuration and interconnection pattern, and therefore the values must be individually defined for individual nodes. Nodes are defined as elements having delays, such as logic gates, interconnections, and the like.

Also, the influence that the variation of each node exerts on the entire path depends on the reference delay (average delay) of the node, and therefore the random variation components of individual nodes are weighted with delays in the expression for calculating the variation of the entire path.

Specifically, a semiconductor integrated circuit is assumed to have n nodes as shown in FIG. 1. In FIG. 1, dn and σn respectively represent the reference delay and random variation of the node.

With the semiconductor integrated circuit having n nodes as shown in FIG. 1, the standard deviation σr of the on-chip random variation components is given by Expression (3)

below. In Expression (3), di and σi respectively represent the reference delay and random variation component of the ith node.

$$\sigma_r(n) = \frac{\sqrt{d_1^2 \times \sigma_1^2 + d_2^2 \times \sigma_2^2 + d_3^2 \times \sigma_3^2 + \ldots + d_{n-1}^2 \times \sigma_{n-1}^2 + d_n^2 \times \sigma_n^2}}{d_1 + d_2 + d_3 + \ldots + d_{n-1} + d_n} \quad (3)$$

$$= \frac{\sqrt{\sum_{i=1}^{n} d_i^2 \times \sigma_i^2}}{\sum_{i=1}^{n} d_i}$$

Weighting with delays in this way offers a more realistic standard deviation of the random variation components.

Now, for the method of designing semiconductor integrated circuits of the present invention, a designing method utilizing Expression (3) will be described with the semiconductor integrated circuit exemplified in FIG. 2.

FIG. 2 shows a semiconductor integrated circuit having 15 nodes from ND0 to ND14, where the nodes ND4, ND6, and ND10 are assumed to be flip-flops, the nodes ND5, ND7 to ND9 are assumed to be AND logic gates, and the other nodes are assumed to be unspecified logic gates.

In FIG. 2, the path passing from the node ND0 to the node ND10 through the nodes ND1 to ND4 and ND7 to ND9, and the path passing to the node ND10 through the nodes ND12 to ND14 are defined as a second path, and the path passing from the node ND2 to the node ND6 through the nodes ND3 to ND5, and the path-passing to the node ND6 through the node ND11 are defined as a first path.

While conventional methods, as shown in FIGS. 11 and 12, handle an arrival path (a data path used as a data signal propagation route) and a required path (a clock path used as a clock signal propagation route) as separate paths, the basic concept of the semiconductor integrated circuit designing method of the invention is to handle the arrival path and the required path as a single path from a statistical standpoint.

Then, in the timing verification of set-up and hold of a target bus, the delays of the arrival path and the required path are obtained and the design conditions are set according to the relative difference.

For example, the set-up condition is defined by Expression (4) below.

Arrival path−Required path<Clock period−α    (4)

The hold condition is defined by Expression (5) below.

Arrival path−Required path>β    (5)

The numerical values α and β are values determined according to factors such as the set-up times and hold times of flip-flops, clock skews, jitters, and the like. In the set-up condition of Expression (4), the condition is set with "Clock period−Value α" such that the relative difference in delay between the arrival path and required path is certainly smaller than the clock period.

Now, the semiconductor integrated circuit, for which the on-chip variation should be considered, can be schematically represented as shown in FIG. 3.

That is, the path can be divided into an arrival path including m nodes from A1 to Am and a required path including n nodes from B1 to Bn. However, as mentioned above, since the semiconductor integrated circuit designing method of the invention handles the arrival path and the required path as a single path from a statistical standpoint, the random variation component σr(m, n) in the semiconductor integrated circuit of FIG. 3 is represented by Expression (6).

$$\sigma_r(m, n) = \frac{\sqrt{\sum_{i=1}^{m} d_{Ai}^2 \times \sigma_{Ai}^2 + \sum_{i=1}^{n} d_{Bi}^2 \times \sigma_{Bi}^2}}{\sum_{i=1}^{m} d_{Ai} + \sum_{i=1}^{n} d_{Bi}} \quad (6)$$

In Expression (6), dAi and σAi respectively represent the delay and random variation component of the ith node of the arrival path, and dBi and σBi respectively represent the delay and random variation component of the ith node of the required path.

Now, with a multi-stage node such as a multi-stage cell including multiple stages of gate circuits, the gate circuit of the first stage has a constant output load and hence a fixed delay component, and so an accurate random variation component σr cannot be obtained when the multi-stage cell is handled as a single node.

In such a case, the multi-stage cell is divided into stages of gate circuits and handled as separate nodes, and then Expression (6) can be applied to obtain an accurate random variation component σr.

Then, the random variation component σr obtained from Expression (6) is substituted in Expression (2) to obtain the on-chip variation component σchip, and from which value the value of delay variation Docv, caused by the on-chip variation, can be determined. The delay variation Docv is given by Expression (7) below.

$$D_{ocv} = D_{base} \times \sigma_{chip} \quad (7)$$

$$= (d_{A1} + d_{A2} + \ldots + d_{Am} + d_{B1} + d_{B1} + d_{B2} + \ldots + d_{Bn}) \times \sigma_{chip}$$

$$= \left(\sum_{i=1}^{m} d_{Ai} + \sum_{i=1}^{n} d_{Bi}\right) \times \sigma_{chip}$$

In Expression (7) above, Dbase represents a reference delay (average delay) of the entire path (arrival path+required path), which is defined by the total of the delays of the nodes.

The value given by Expression (7) can be regarded as a delay variation from the reference delay caused by the on-chip variation component chip, and using this value in designing the semiconductor integrated circuit allows the design to consider the on-chip variation component.

Figure 4:
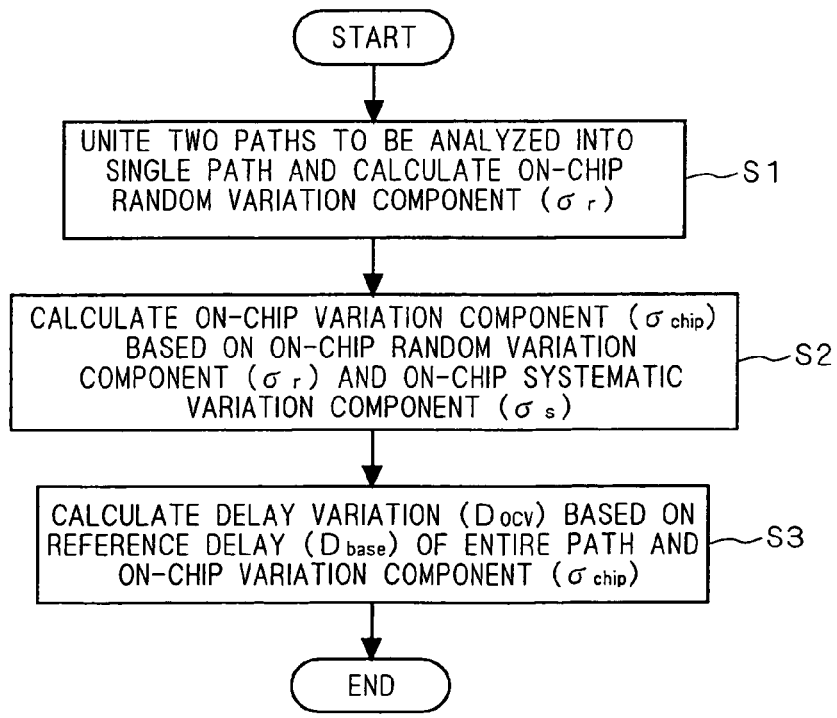
FIG. 4 is a flowchart showing the basic concept of the semiconductor integrated circuit designing method of the invention.

FIG. 4 is a flowchart that summarizes the basic concept of the semiconductor integrated circuit designing method of the invention.

That is, in step S1 of FIG. 4, two paths as the target of analysis (an arrival path and a required path) are united into a single path, and the on-chip random variation component (σr) is calculated about the plurality of nodes forming the single path (united path).

Next, in step S2, the on-chip variation component σchip is calculated on the basis of the on-chip random variation component (σr) and the on-chip systematic variation component (σs).

Subsequently, in step S3, the delay variation (Docv) is calculated on the basis of the reference delay of the entire path (Dbase) and the on-chip variation component (σchip).

A specific example of calculation will be described later.

B. Example of Application of the Invention

Next, an application of the semiconductor integrated circuit designing method of the invention will be described.

Handling arrival and required paths as a single path from a statistical standpoint allows the designing process to obtain the on-chip random variation component σr as a more realistic value (a value close to that of statistical STA).

Conventional methods are capable of obtaining realistic values of the on-chip systematic variation component σs and the off-chip variation component σf, and it is therefore relatively easy to obtain the on-chip variation component σchip and the all variation σall when a more realistic value of the random variation component σr can be obtained.

When the on-chip variation component σchip and the all variation σall are thus obtained, design verification points can be set for each path while considering variations. A method of setting design verification points considering variations will be described below.

First, suppose that only the off-chip variation component is to be considered, that a delay excluding all variation components (which can be regarded also as an average value of delay considering all variations) is represented as Daverage, and that a standard deviation 1σ is covered about the off-chip variation component, and then the range of the reference delay Dbase for the entire path is given by Expression (8) below.

$$D_{average} \times (1-\sigma_f) \leq D_{base} \leq D_{average} \times (1+\sigma_f) \tag{8}$$

When the range above is all covered, the maximum value of the reference delay Dbase is given by Expression (9) below.

$$D_{base} = D_{average} \times (1+\sigma_f) \tag{9}$$

In this case, when the on-chip variation is considered, the range of delay Dall including all variations can simply be given by Expression (10) below.

$$D_{base} \times (1-\sigma_{chip}) \leq D_{all} \leq D_{base} \times (1+\sigma_{chip}) \tag{10}$$

When the range above is all covered, the maximum value of the delay Dall is given by Expression (11) below.

$$\begin{aligned} D_{all} &= D_{base} \times (1-\sigma_{chip}) \\ &= D_{average} \times (1+\sigma_f) \times (1+\sigma_{chip}) \\ &= D_{average} \times (1+\sigma_f) \times \left(1+\sqrt{\sigma_r^2+\sigma_s^2}\right) \end{aligned} \tag{11}$$

Next, when the all variation σall is considered and standard deviation 1σ is to be covered, then the range of delay Dall including all variation components is given by Expression (12) below.

$$D_{average} \times (1-\sigma_{all}) \leq D_{all} \leq D_{average} \times (1+\sigma_{all}) \tag{12}$$

Then, when the range above is all covered, the maximum value of the delay Dall including all variation components is given by Expression (13).

$$D_{all} = D_{average} \times (1+\sigma_{all}) \tag{13}$$

From Expression (13), the statistical maximum value is given by Expression (14) below.

$$D_{all} = D_{average} \times (1+\sigma_{all}) = D_{average} \times (1+\sqrt{\sigma_f^2+\sigma_r^2+\sigma_s^2}) \tag{14}$$

The delay Dall including all variation components given by Expression (14) above is smaller than the delay Dall given by Expression (11), and using Expression (11) in designing therefore considers a margin more than is necessary.

Accordingly, the reference delay Dbase is set such that the delay Dall does not exceed the value of Expression (14) and such that the delay Dall of Expression (10) is covered.

That is, Expression (11) is not used, but Expression (15) below is used, and Dbase is set to satisfy the Expression (15).

$$D_{base} \times (1+\sigma_{chip}) = D_{average} \times (1+\sigma_{all}) = D_{average} \times (1+\sqrt{\sigma_f^2+\sigma_r^2+\sigma_s^2}) \tag{15}$$

By using Expression (15), it is possible to set the range of delay Dall including all variation components while considering the on-chip variation component σchip of each path, and the maximum value and the minimum value of that range correspond to design verification points. A specific example of the setting of the range of the delay Dall will be described later.

C. Example of Calculation of Delay Variations

A specific example of calculation of the delay variation Docv will be described below.

Variation components caused by semiconductor process are classified, the ratio of delay variation caused by each variation component (the ratio of variation from reference delay) is assumed to be a normal distribution, and the standard deviation thereof is assumed as below. That is, it is assumed that the ratio of delay variation due to the on-chip random variation component is covered with 3σ and 3σr=20%.

Also, the ratio of delay variation due to the on-chip systematic variation component is covered with 3σ and 3σs=3%.

Also, the ratio of delay variation considering the off-chip variation component is covered with 3σ and 3σf=20%.

Now, the on-chip random variation component varies with the circuit configuration and interconnection pattern, and the value is the maximum value of all possible configurations. Also, in order to cover a wide range of variation, they are all represented with 3σ.

From these values, the maximum values of the all-variation-including component and the on-chip variation component can be obtained from Expressions (1) and (2).

That is, from Expression (1), the all variation including component 3σall≈28.4%, and from Expression (2), the on-chip variation component 3σchip≈20.2%.

Figure 5:
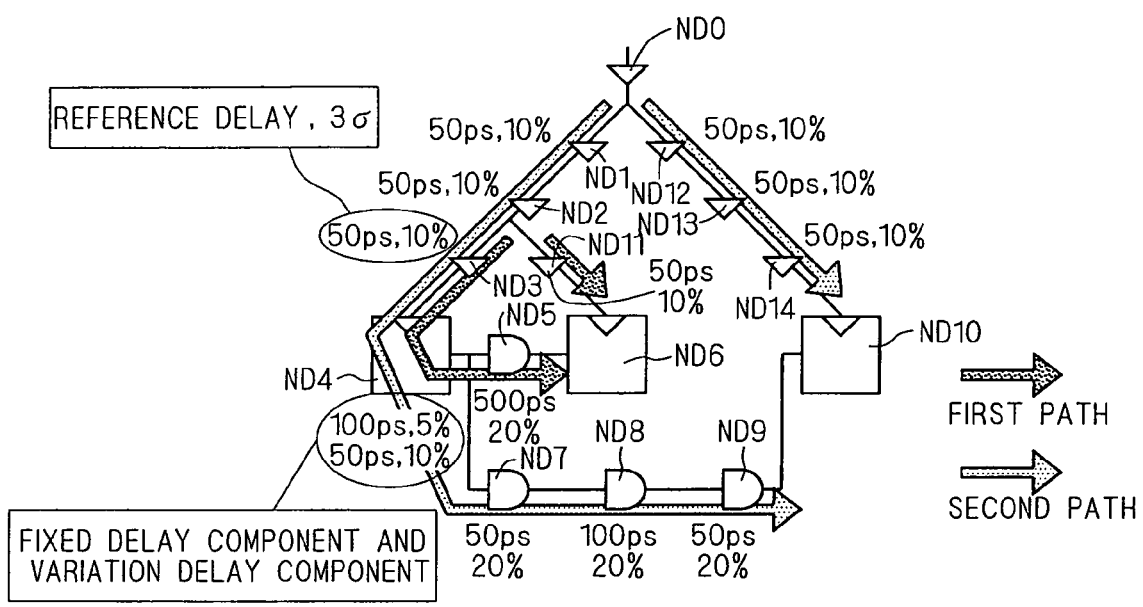
FIG. 5 is a diagram illustrating the values of reference delays and random variation components of nodes of the semiconductor integrated circuit.

Now, for the nodes of the semiconductor integrated circuit having the first and second paths shown in FIG. 2, the values of reference delays and random variation components are assumed as shown in FIG. 5.

That is, for the nodes ND1 to ND3 and ND11 to ND14, the reference delay is 50 ps (picoseconds) and the random variation component is 10%. For the node ND5, the reference delay is 500 ps and the random variation component is 20%, and for the nodes ND7 and ND9, the reference delay is 50 ps and the random variation component is 20%. For the node ND8, the reference delay is 100 ps and the random variation component is 20%.

The flip-flops configuring the nodes ND4, ND6, and ND10 are regarded as multi-stage cells, and particularly the node ND4 is divided into a fixed delay component in the first-stage gate circuit and a variation delay component in the output gate circuit, and is handled as having a cell with a reference delay of 100 ps and a random variation component of 5% and a cell with a reference delay of 50 ps and a random variation component of 10%. Further division may be required depending on the configuration of the flip-flop.

Expression (3) is applied to the first and second paths shown in FIG. 5 to calculate the random variation components 3σr as shown below.

That is, for the first path, 3σr=14.3% from Expression (16) below.

$$3\sigma_r = \frac{\sqrt{\begin{array}{c}50\ ps^2 \times 10\%^2 + 100\ ps^2 \times 5\%^2 + \\ 50\ ps^2 \times 10\%^2 + 500\ ps^2 \times 20\%^2\end{array}}}{50\ ps + 100\ ps + 50\ ps + 500\ ps} \tag{16}$$

For the second path, 3σr=4.4% from Expression (17) below.

$$3\sigma_r = \sqrt{\frac{\begin{array}{l}50\text{ ps}^2\times10\%^2+50\text{ ps}^2\times10\%^2+50\text{ ps}^2\times10\%^2+\\100\text{ ps}^2\times5\%^2+50\text{ ps}^2\times10\%^2+50\text{ ps}^2\times20\%^2+\\100\text{ ps}^2\times20\%^2+50\text{ ps}^2\times20\%^2+50\text{ ps}^2\times\\10\%^2+50\text{ ps}^2\times10\%^2+50\text{ ps}^2\times10\%^2\end{array}}{\begin{array}{l}50\text{ ps}+50\text{ ps}+50\text{ ps}+100\text{ ps}+50\text{ ps}+50\text{ ps}+\\100\text{ ps}+50\text{ ps}+50\text{ ps}+50\text{ ps}+50\text{ ps}\end{array}}} \quad (17)$$

From these values, for the first and second paths, the all variation including components and the on-chip variation components are calculated as shown below from Expressions (1) and (2).

That is, for the first path, from Expressions (18) and (19) below, $3\sigma\text{all}=24.8\%$ and $3\sigma\text{chip}=14.6\%$.

$$3\sigma_{all}=3\times\sqrt{\sigma_r^2+\sigma_s^2+\sigma_f^2}=\sqrt{14.3\%^2+3\%^2+20\%^2}=24.8\% \quad (18)$$

$$3\sigma_{chip}=3\times\sqrt{\sigma_r^2+\sigma_s^2}=\sqrt{14.3\%^2+3\%^2}=14.6\% \quad (19)$$

For the second path, from Expressions (20) and (21) below, $3\sigma\text{all}=20.7\%$ and $3\sigma\text{chip}=5.3\%$.

$$3\sigma_{all}=3\times\sqrt{\sigma_r^2+\sigma_s^2+\sigma_f^2}=\sqrt{4.4\%^2+3\%^2+20\%^2}=20.7\% \quad (20)$$

$$3\sigma_{chip}=3\times\sqrt{\sigma_s^2+\sigma_r^2}=\sqrt{4.4\%^2+3\%^2}=5.3\% \quad (21)$$

Thus, it is seen that the all variation including components and the on-chip variation components both differ between the first and second paths.

Then, for the first and second paths, the delay variations Docv caused by the on-chip variation components $3\sigma\text{chip}$ are calculated as shown below from Expression (7). It should be noted that both values are represented as a delay variation with respect to the reference delay of the entire path.

That is, for the first path, Docv=102.6 ps from Expression (22) below.

$$\begin{aligned}D_{ocv} &= \text{Reference delay of entire first path} \times 3\sigma_{chip} \quad (22)\\ &= (50\text{ ps}+100\text{ ps}+50\text{ ps}+500\text{ ps})\times14.6\%\\ &= 102.6\text{ ps}\end{aligned}$$

For the second path, Docv=34.3 ps from Expression (23) below.

$$\begin{aligned}D_{ocv} &= \text{Reference delay of entire second path} \times 3\sigma_{chip} \quad (23)\\ &= (50\text{ ps}+50\text{ ps}+50\text{ ps}+100\text{ ps}+50\text{ ps}+50\text{ ps}+\\ &\quad\;\; 100\text{ ps}+50\text{ ps}+50\text{ ps}+50\text{ ps}+50\text{ ps})\times5.3\%\\ &= 34.3\text{ ps}\end{aligned}$$

In designing the semiconductor integrated circuit, the delay variations Docv obtained through the process above are considered, and the design can incorporate therein the delays covering the range of the on-chip variation component $3\sigma\text{chip}$.

While the above example of calculation covers $3\sigma\text{chip}$, the delay can be considered in the same way even when the range to be covered is changed. Also, the description above assumes that the delay becomes slower, but the consideration can be taken in the same way even when the delay becomes faster.

Also, while the systematic variation component as has a fixed value in the example above, it can be handled in the same way even when it is given as a functional representation having, e.g., positional dependence.

The reference delay can be various delays, such as typical delay not considering variations, or an average value of delay considering off-chip variation component.

Also, while the range of coverage of $3\sigma$ may be sufficient for a single path, the range of coverage can be determined according to the number of critical paths. For example, more than $3\sigma$ may be considered when there are a plurality of critical paths.

D. Example of Setting of Delay Including All Variation Components

Next, a specific example of the setting of the ranges of delay Dall including all variation components will be described referring to FIGS. 6 and 7. The example will be described with the semiconductor integrated circuit shown in FIG. 5 as an example.

First, by the method described with Expressions (16) to (21), the all variation including components $\sigma\text{all}$ and the on-chip variation components $\sigma\text{chip}$ are obtained for all paths including the first and second paths. Now, it is assumed that the semiconductor integrated circuit shown in FIG. 5 includes a plurality of paths in addition to the first and second paths, and the path having the logically possible largest variation is referred to as a worst path, and then the variation components of the paths are represented as below.

Worst path's $3\sigma\text{all}\approx28.4\%$
Worst path's $3\sigma\text{chip}\approx20.2\%$
First path's $3\sigma\text{all}=24.8\%$
First path's $3\sigma\text{chip}=14.6\%$
Second path's $3\sigma\text{all}=20.7\%$
Second path's $3\sigma\text{chip}=5.3\%$ Then, on the basis of the values above, the range of coverage is set for each path as shown below, assuming that $3\sigma\text{all}$ and $3\sigma\text{chip}$ are covered for each path.

That is, the setting is made in such a way that the performance of the semiconductor integrated circuit is not verified when the all variation including component exceeds $3\sigma\text{all}$, or when the on-chip variation component exceeds $3\sigma\text{chip}$.

In other words, the range of strictest conditions is adopted as design condition such that the all variation including component does not exceed $3\sigma\text{all}$ and the on-chip variation component does not exceed $3\sigma\text{chip}$.

Figure 6:
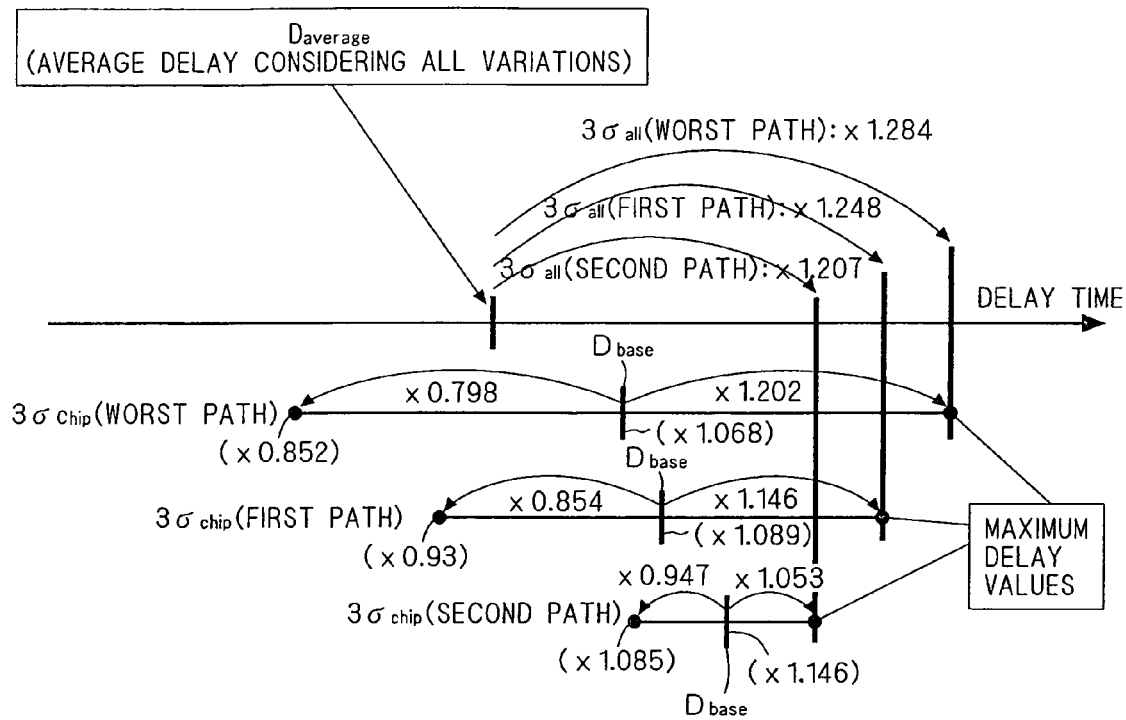
FIG. 6 is a diagram illustrating a specific example of setting of ranges of delay including all variation components.

What reflects this design condition is Expression (15), and FIG. 6 schematically illustrates a method of setting design verification points based on Expression (15).

As shown in FIG. 6, the average delay Daverage, considering all variations, is multiplied by the coefficient $(1+3\sigma\text{all})$ calculated for each path, so as to obtain the maximum value of the delay Dall including all variation components for each path (which is hereinafter referred to as maximum delay value).

The values of $(1+3\sigma\text{all})$ calculated for the paths are 1.284 for the worst path, 1.248 for the first path, and 1.207 for the second path.

Then, with the maximum delay values of the paths, the reference delays Dbase are set for the individual paths such that Expression (15) is satisfied, so as to determine apparent reference delays Dbase.

That is, for each path, a value that attains the maximum delay value of the path when multiplied by the coefficient $(1+3\sigma\text{chip})$ calculated for that path provides the apparent reference delay Dbase of that path. When Daverage is 1, the apparent reference delay Dbase of the worst path is 1.068, the apparent reference delay Dbase of the first path is 1.089, and the apparent reference delay Dbase of the second path is 1.146.

Then, for each path, the apparent reference delay Dbase of the path is multiplied by the coefficient of (1−3σchip) calculated for the path, so as to obtain the minimum value of the delay Dall including all variation components of the path (hereinafter referred to as minimum delay value). When Daverage is 1, the minimum delay value of the worst path is 0.852, the minimum delay value of the first path is 0.93, and the minimum delay value of the second path is 1.085.

By the method above, the allowable range of the delay Dall including all variation components (the range defined by Expression (10)) is set for each path, and the maximum delay value and the minimum delay value thereof are set as design verification points and the delays of the semiconductor integrated circuit are designed such that these values are not exceeded.

When the allowable ranges of delays Dall are set by the method above, the reference delays apparently vary among the paths, as can be seen from FIG. 6.

When reference delays differ among paths, the information (library) about gate circuits and interconnections of nodes, required to calculate the reference delays, becomes complicated, and the design process is also complicated.

Accordingly, a method of simplifying the design process by setting the reference delays at a single point will be described referring to FIG. 7.

Figure 7:
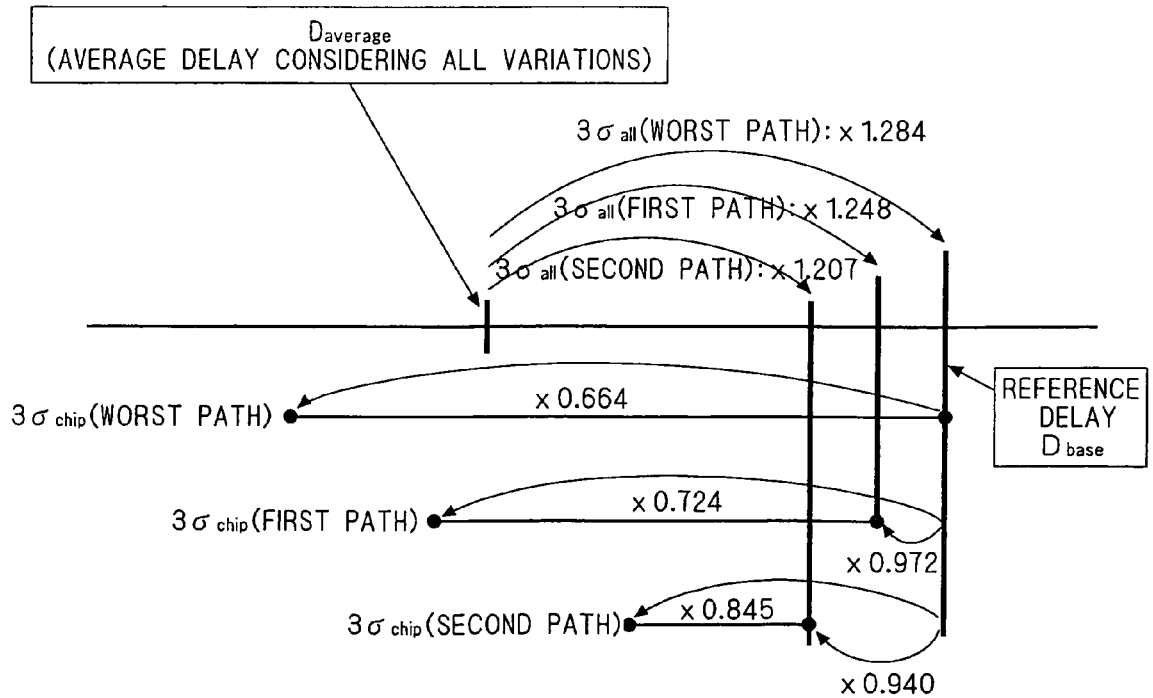
FIG. 7 is a diagram illustrating a specific example of setting of ranges of delay including all variation components.

As shown in FIG. 7, the reference delay is uniquely determined at the point obtained by multiplying the Daverage, an average delay considering all variations, by the coefficient of (1+3σall) calculated for the worst path. This value is, of course, the maximum delay value of the worst path.

This reference delay is 1.284 when Daverage is 1, and the minimum delay value of the worst path is obtained by multiplying this value by a coefficient 0.664. The minimum delay value of the worst path is 0.852.

Also, the value obtained by multiplying the reference delay by a coefficient 0.724 provides the minimum delay value of the first path. The minimum delay value of the first path is 0.93.

Also, the value obtained by multiplying the reference delay by a coefficient 0.845 provides the minimum delay value of the second path. The minimum delay value of the second path is 1.085.

As for the maximum delay values of the paths, that of the worst path has been already determined, and the maximum delay value of the first path is the reference delay multiplied by 0.972 (1.248/1.284), and the maximum delay value of the second path is the reference delay multiplied by 0.940 (1.207/1.284).

In this way, the maximum delay value of the worst path is set as the reference delay, and correction coefficients about the reference delay are set for the other paths in the library, whereby the maximum delay values and minimum delay values can be set for individual paths.

Adopting this method allows the setting of a common reference delay for all paths, without causing the reference delay to vary among paths, which allows the use of simplified library for gate circuits and interconnections of nodes that is required to calculate the reference delay, thus simplifying the design process. This enables the design method of the invention to be applied as an extension of existing design methods.

Also, more realistic values of the on-chip random variation component σr are reflected in the design of the semiconductor integrated circuit, whereby design margins more than necessary are avoided to enhance performance and design convergence, and necessary margins are ensured to enhance quality.

E. Configuration of Semiconductor Integrated Circuit Designing Apparatus

A method of designing semiconductor integrated circuits has been described, and the method of designing can be conducted with the semiconductor integrated circuit designing apparatus described below.

Figure 8:
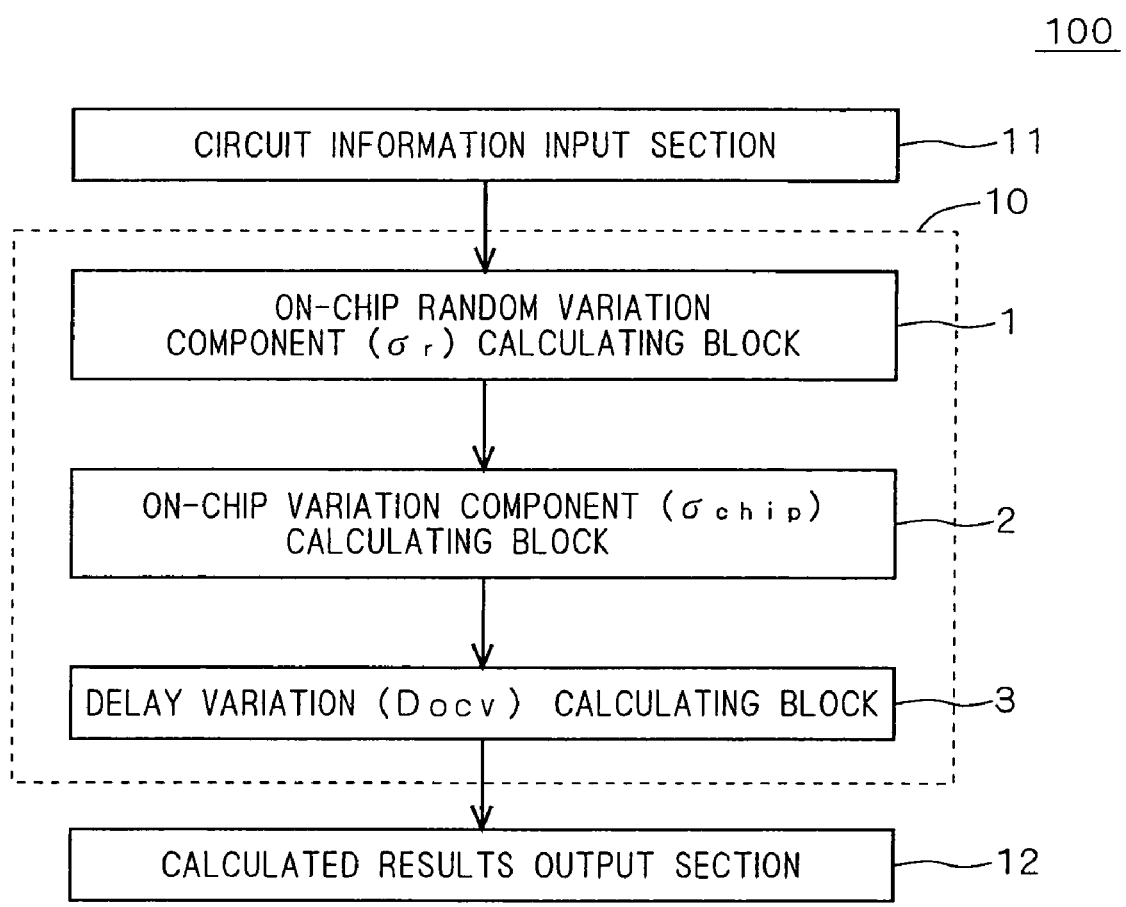
FIG. 8 is a block diagram illustrating the configuration of a semiconductor integrated circuit designing apparatus according to the invention.

FIG. 8 is a block diagram showing the configuration of a semiconductor integrated circuit designing apparatus 100 according to the present invention.

The semiconductor integrated circuit designing apparatus 100 includes a circuit information input section 11 through which circuit information about the semiconductor integrated circuit to be designed is entered, a calculation section 10 that performs given calculations on the basis of the circuit information received through the circuit information input section 11, and a calculated results output section 12 that outputs the results of calculations obtained in the calculation section 10. The circuit information includes a net list indicating connections among nodes, delay information about the nodes, etc.

The calculation section 10 includes an on-chip random variation component calculating block 1 that unites two paths to be analyzed (arrival and required paths) into a single path and calculates the on-chip random variation component (σr) about a plurality of nodes forming that single path (united path), an on-chip variation component calculating block 2 that calculates the on-chip variation component σchip on the basis of the on-chip random variation component (σr) calculated in the on-chip random variation component calculating block 1 and the on-chip systematic variation component (σs), and a delay variation calculating block 3 that calculates the delay variation (Docv) on the basis of the reference delay (Dbase) of the entire path and the on-chip variation component (σchip).

The delay variation (Docv) obtained in the delay variation calculating block 3 is given to the calculated results output section 12, and the delay variation (Docv) is, for example, displayed in a display device (not shown) or outputted as data, through the calculated results output section 12, whereby the information about the delay variation (Docv) is provided for the following design process of the semiconductor integrated circuit.

Techniques for reflecting the information about the delay variation (Docv) in the design of the semiconductor integrated circuit are well known for those skilled in the art, and the description herein does not give specific device configurations and explanations thereof.

F. Example of Implementation of Semiconductor Integrated Circuit Designing Apparatus The semiconductor integrated circuit designing apparatus 100 described above can be implemented with a computer system as shown in FIG. 9, for example.

Figure 9:
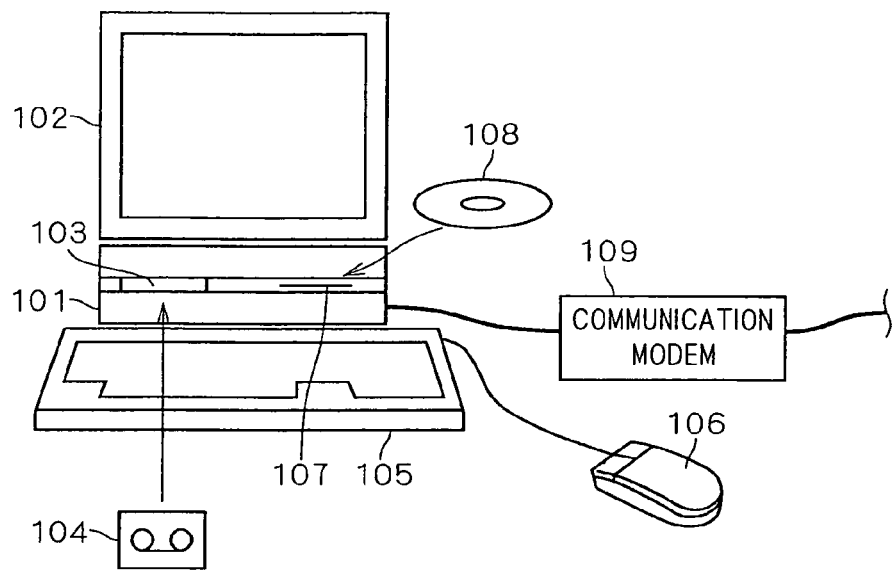
FIG. 9 is a diagram showing the appearance of a computer system that realizes the semiconductor integrated circuit designing apparatus of the invention.

That is, as shown in FIG. 9, the semiconductor integrated circuit designing apparatus 100 includes a computer 101, a display device 102, a magnetic recording/reproducing device 103 in which a magnetic recording medium 104, such as magnetic tape or a magnetic disk, is installed, a keyboard 105, a mouse 106, an optical disk device 107 in which an optical disk 108, such as a CD (Compact Disk) or a DVD (Digital Video Disk), is installed, and a communication modem 109.

The functions of the on-chip random variation component calculating block 1, the on-chip variation component calculating block 2, and the delay variation calculating block 3 of the calculation section 10 of the semiconductor integrated circuit designing apparatus 100 can be realized by executing a computer program (a program for designing semiconductor integrated circuits) on the computer, in which case the program is supplied by means of a recording medium like the magnetic recording medium 104 or the optical disk 108. Alternatively, the program may be propagated on a communication path in the form of signal, and supplied from another computer to the computer 101 via a communication channel and through the communication modem 109, and it can be used in the form downloaded in a recording medium.

The semiconductor integrated circuit designing program is executed on the computer 101 and the operator conducts the circuit design in an automatic manner by operating the keyboard 105 or the mouse 106 while watching the display device 102.

Figure 10:
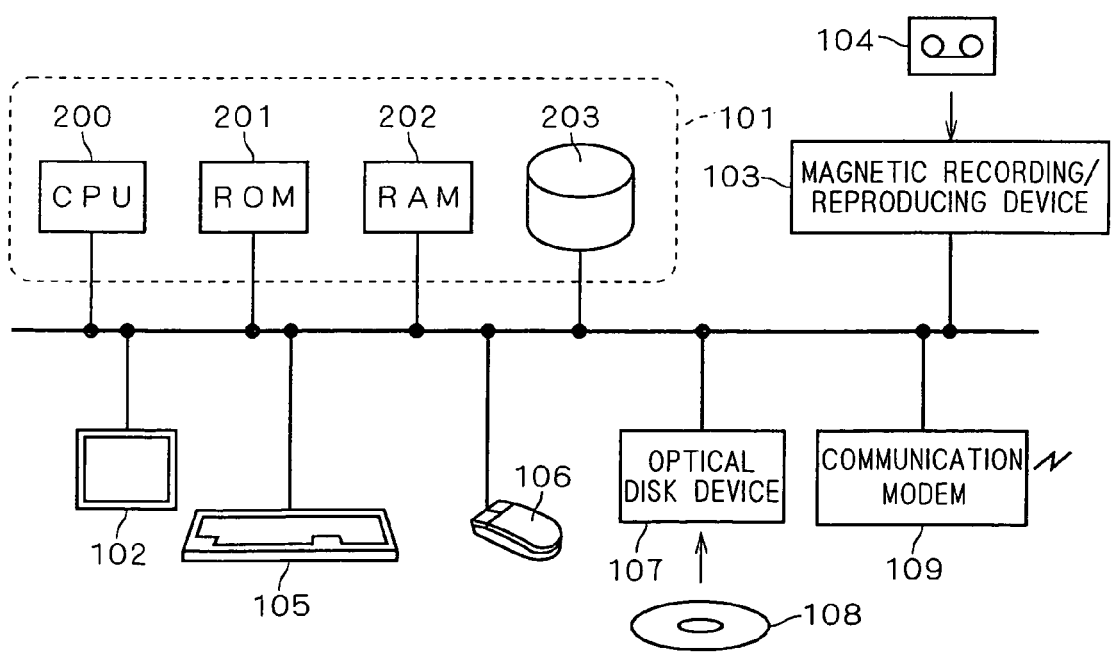
FIG. 10 is a diagram illustrating the configuration of the computer system that realizes the semiconductor integrated circuit designing apparatus of the invention.

FIG. 10 is a block diagram showing the configuration of the computer system of FIG. 9. The computer 101 shown in FIG. 10 includes a CPU (Central Processing Unit) 200, a ROM (Read Only Memory) 201, a RAM (Random Access Memory) 202, and a hard disk 203.

The CPU 200 operates while sending/receiving data to and from the display device 102, magnetic recording/reproducing device 103, keyboard 105, mouse 106, optical disk device 107, communication modem 109, ROM 201, RAM 202, and hard disk 203.

The semiconductor integrated circuit designing program recorded in the magnetic recording medium 104 or the optical disk 108 is once stored in the hard disk 203 by the CPU 200. The CPU 200 then performs the designing of the semiconductor integrated circuit by executing the program while loading the program from the hard disk 203 to the RAM 202 as needed.

In this way, the semiconductor integrated circuit designing apparatus 100 is realized with a computer system and the semiconductor integrated circuit designing method of the present invention is conducted with a computer program, whereby the semiconductor integrated circuit designing method of the invention can be used versatilely.

The computer system above has been described by way of illustration, and the present invention is not limited to this example but can be implemented with any equipment capable of executing the semiconductor integrated circuit designing program, and the recording media are not limited to magnetic recording medium 104 and optical disk 108.

The present invention is applicable to all SOC (System On Chip) semiconductor products that require synchronization designing.

While the invention has been described in detail, the foregoing description is in all aspects illustrative and not restrictive. It is understood that numerous other modifications and variations can be devised without departing from the scope of the invention.

What is claimed is:

1. A method of designing a semiconductor integrated circuit that is formed of a connection of a plurality of nodes and that has a clock path and a data path, said method comprising the steps of:
   (a) uniting said clock path and said data path into a single path;
   (b) calculating, using a computer system, a standard deviation of random variation components of said plurality of nodes of said united path, the random variation components being respectively weighted with delays;
   (c) calculating a standard deviation of on-chip variation components on the basis of said standard deviation of the random variation components and a standard deviation of systematic variation components of said plurality of nodes of said united path; and
   (d) calculating a delay variation on the basis of said standard deviation of on-chip variation components and a reference delay of an entirety of said united path.

2. The semiconductor integrated circuit designing method according to claim 1, wherein said clock path serves as a clock signal propagation route and said data path serves as a digital signal propagation route.

3. The semiconductor integrated circuit designing method according to claim 1, wherein said plurality of nodes include a multi-stage-structured node that is divided into divided stages and having a fixed delay component.

4. The semiconductor integrated circuit designing method according to claim 3, wherein in step (a), said divided stages are incorporated as separate nodes in the calculation of said standard deviation of the random variation components.

5. The semiconductor integrated circuit designing method according to claim 1, further comprising the steps of:
   (e) calculating a standard deviation of components including other chip variation components in addition to said on-chip variation components; and
   (f) setting a range of coverage of said standard deviation of the on-chip variation components such that a maximum value of said standard deviation of the on-chip variation components does not exceed a maximum value of said standard deviation of the components including all chip variation components.

* * * * *